United States Patent
Kitamura et al.

(10) Patent No.: US 11,022,862 B2
(45) Date of Patent: Jun. 1, 2021

(54) IMAGING SYSTEM

(71) Applicant: CANON KABUSHIKI KAISHA, Tokyo (JP)

(72) Inventors: Gen Kitamura, Kawasaki (JP); Honkai Tomimoto, Tokyo (JP); Hirotsugu Noda, Tokyo (JP); Hitoshi Kawahara, Tokyo (JP); Tatsuya Otoshi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/532,831

(22) Filed: Aug. 6, 2019

(65) Prior Publication Data

US 2020/0064714 A1 Feb. 27, 2020

(30) Foreign Application Priority Data

Aug. 23, 2018 (JP) .............................. JP2018-156083

(51) Int. Cl.
  *G03B 17/56* (2021.01)
  *H04N 5/225* (2006.01)

(52) U.S. Cl.
  CPC ................................ *G03B 17/561* (2013.01)

(58) Field of Classification Search
  CPC .................................................... G03B 17/561
  See application file for complete search history.

(56) References Cited

U.S. PATENT DOCUMENTS

| | | | |
|---|---|---|---|
| 6,734,902 B1 | 5/2004 | Kawahara | |
| 6,793,414 B2 * | 9/2004 | Akada | H04N 5/23299 396/427 |
| 8,292,248 B2 * | 10/2012 | Shi | F16M 11/18 248/349.1 |
| 9,706,097 B2 | 7/2017 | Kawahara | |
| 2010/0225758 A1 * | 9/2010 | Mashiah | H04N 7/183 348/143 |
| 2019/0052784 A1 | 2/2019 | Sawai et al. | |

FOREIGN PATENT DOCUMENTS

| | | | |
|---|---|---|---|
| JP | 63099785 A * | 5/1988 | H02N 2/163 |
| JP | 2017-158083 A | 9/2017 | |

* cited by examiner

*Primary Examiner* — Clayton E. LaBalle
*Assistant Examiner* — Leon W Rhodes, Jr.
(74) *Attorney, Agent, or Firm* — Venable LLP (57) ABSTRACT

An imaging system includes a movable body and a fixed body. In movable body, an imaging device capable of changing an imaging direction is provided. In the fixed body, a circular rail member is provided. The fixed body supports the rail member to be rotatable along the rail member.

13 Claims, 7 Drawing Sheets

IMAGING SYSTEM

BACKGROUND OF THE INVENTION

Field of the Invention

The present invention relates to an imaging system.

Description of the Related Art

With miniaturization of cameras, wearable cameras that are cameras functioning as wearable devices mounted on human bodies have recently been proposed. As kinds of wearable cameras, there are a wristwatch type, a chest-mounted type, a head-mounted type, and the like. Since wearable cameras can easily be mounted on human bodies, the wearable cameras can be widely used in a daily life, sports, and various other various situations. Japanese Patent Laid-Open No. 2017-158083 discloses an information processing device that is mounted around the neck of a user and controls an angle of field of an image of a camera in accordance with an assumed posture of a user.

However, an image acquisition unit (imaging unit) of the information processing device disclosed in Japanese Patent Laid-Open No. 2017-158083 is disposed on the front side of the human body, and thus can image only to the front of the user on which the information processing device is mounted. When an image to the rear side of the user is acquired, it is necessary for the user to manually move the information processing device. Accordingly, only a limited imaging range which is only to the front side or the rear side of the user can be imaged with the information processing device.

SUMMARY OF THE INVENTION

The present invention provides an imaging system capable of imaging a broad imaging range when the imaging system is mounted on a mounting object to perform imaging.

According to an embodiment of the present invention, an imaging system includes a movable unit in which an imaging device capable of changing an imaging direction is provided; and a fixed unit in which a circular rail unit is provided and which supports the rail unit to be rotatable.

Further features of the present invention will become apparent from the following description of exemplary embodiments with reference to the attached drawings.

DESCRIPTION OF THE EMBODIMENTS

Figure 1A:
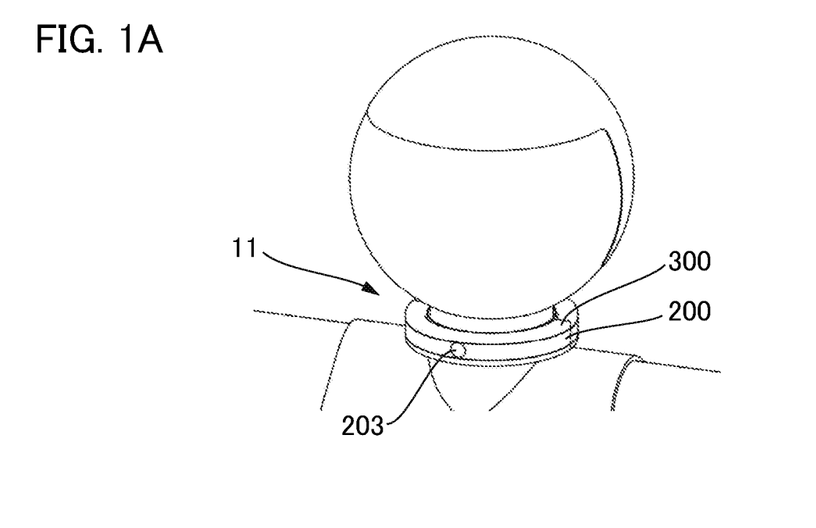
FIGS. 1A to 1C are diagrams illustrating a configuration example of an imaging system.
Figure 1B:
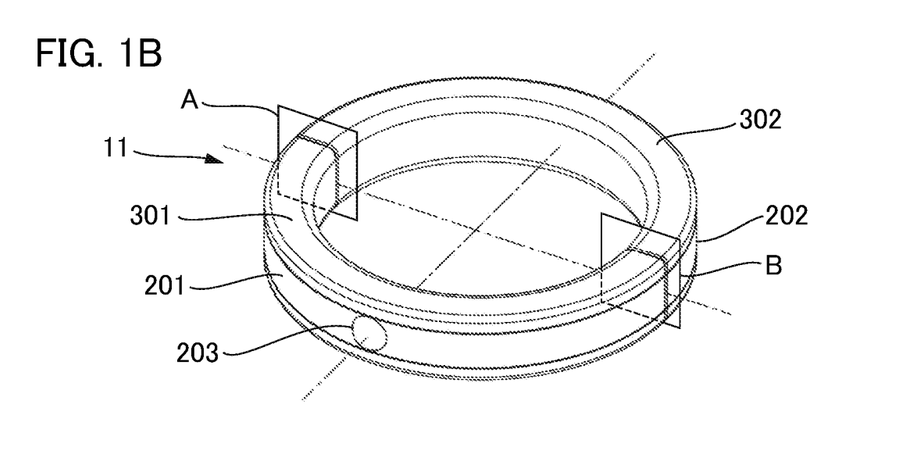
Figure 1C:
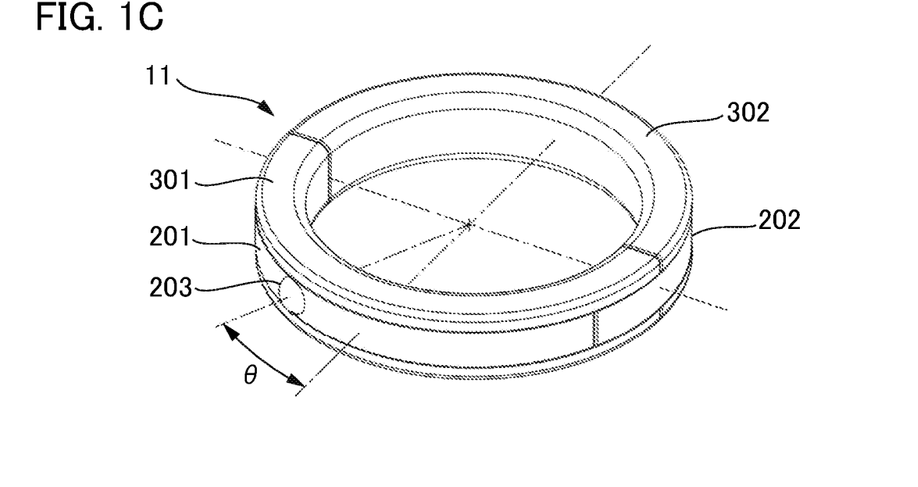

FIGS. 1A to 1C are diagrams illustrating a configuration example of an imaging system according to an embodiment.

A case in which an imaging system is used in a wearable terminal 11 will be described as an example with reference to FIGS. 1A to 1C. The wearable terminal 11 is a wearable device that is mounted on a mounting object to perform imaging. The mounting object is, for example, a human body, a robot, a car body, or a drone. In the embodiment, the wearable terminal 11 which can be mounted on the body (for example, the neck) of a user will be described as an example.

FIG. 1A illustrates a state in which the wearable terminal 11 is mounted on the user. FIG. 1B illustrates a state in which a movable body is in an initial phase with respect to a fixed body immediately after the wearable terminal 11 is mounted on the user. FIG. 1C illustrates a state in which the movable body of the wearable terminal 11 illustrated in FIG. 1B is moved by a predetermined angle θ from the initial phase.

The wearable terminal 11 includes an imaging device 100 (see FIG. 3), a fixed body 300, and a movable body 200. The fixed body 300 is a circular member (a fixed unit) fixed to the user. The movable body 200 is a circular member (a movable unit) that is supported to be rotatable relative to the fixed body 300 by the fixed body 300. The movable body 200 is rotatable along a circular rail member 307 (see FIG. 5) included in the fixed body 300. The imaging device 100 is provided on the outer circumferential surface (the side facing the fixed unit) of the movable body 200. Specifically, the imaging device 100 is provided inside a window unit 203 formed of a transparent resin included in the movable body 200. The shapes of the movable body 200 and the fixed body 300 are not limited to the circular shape.

The movable body (mover) 200 can be partitioned into a first movable body (a first movable unit) 201 and a second movable body (a second movable unit) 202 illustrated in FIG. 1B in accordance with a plurality of partition surfaces. In the embodiment, the imaging device 100 is provided in the first movable body 201. Similarly, the fixed body (base) 300 can be partitioned into a first fixed body (a first fixed unit) 301 and a second fixed body (a second fixed unit) 302 in accordance with a plurality of partition surfaces. Thus, when the wearable terminal 11 is mounted on or demounted from the user, the fixed body 300 can be partitioned into front and back portions in accordance with a partition surface A and a partition surface B. The movable body 200 and the fixed body 300 may be able to be partitioned into at least two pieces and a partition aspect is not limited to 2-partition.

In FIG. 1C, the movable body 200 is rotatable by the angle θ clockwise with respect to the fixed body 300 when viewed from the upper side by the user. The first movable body 201 and the second movable body 202 are rotated integrally to be rotatable by any angle in a clockwise or counterclockwise direction. The wearable terminal 11 can be partitioned only in the case of a phase in which the partition surface of the movable body 200 matches the partition surface of the fixed body 300, as illustrated in FIG. 1B.

Figure 2A:
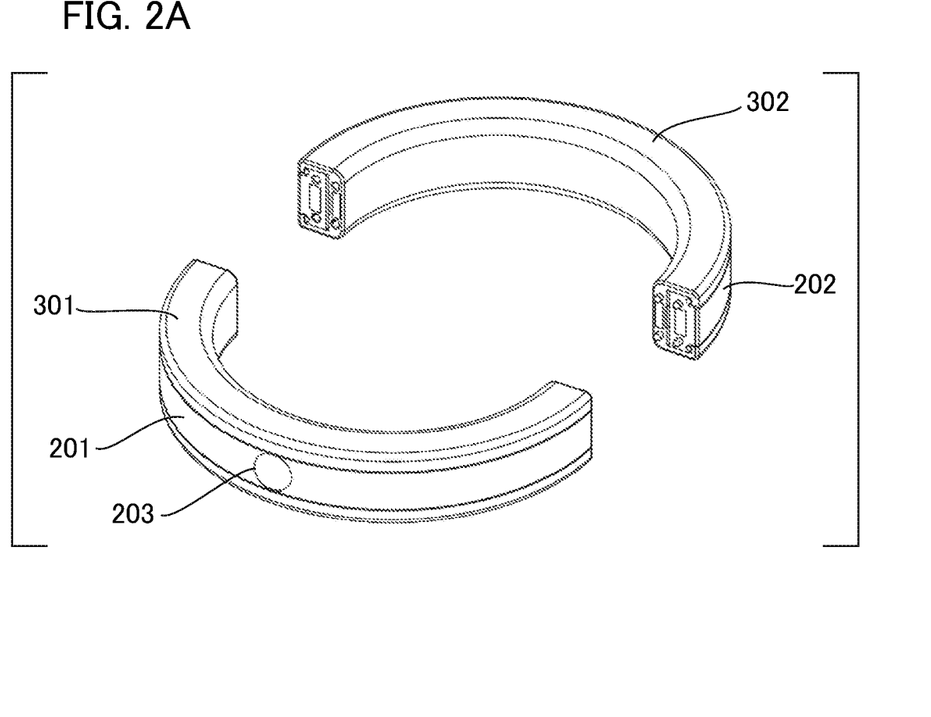
FIGS. 2A and 2B are explanatory diagrams illustrating a configuration of a partition surface of a wearable terminal.
Figure 2B:
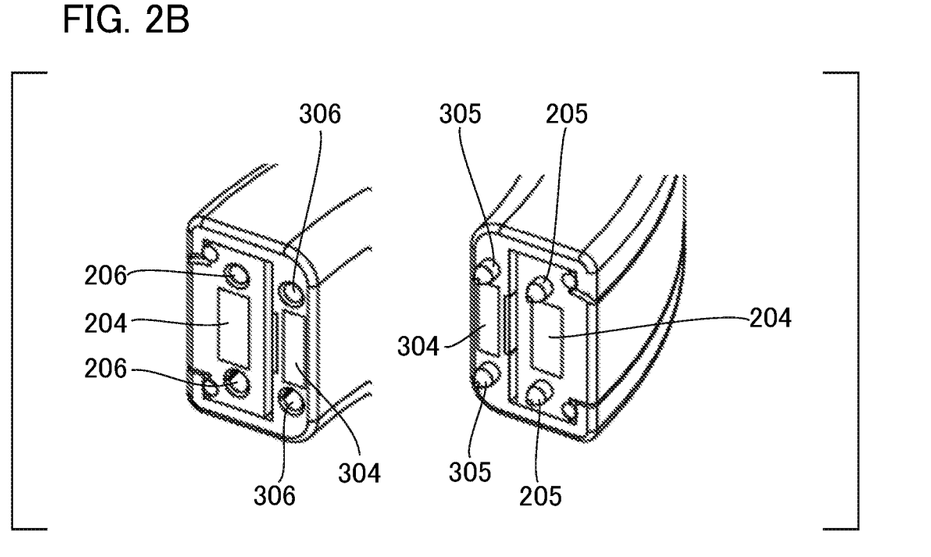

FIGS. 2A and 2B are explanatory diagrams illustrating a configuration of a partition surface of a wearable terminal.

FIG. 2A illustrates a state in which the wearable terminal 11 is partitioned into front and back portions. FIG. 2B is an expanded diagram illustrating the partition surfaces of the second movable body 202 and the second fixed body 302. Positioning pins 205 and 305 and positioning holes 206 and 306 are provided on the cross-sections of the second movable body 202 and the second fixed body 302. The positioning pins 205 and 305 and the positioning holes 206 and 306 are fitted with positioning holes and positioning pins (not illustrated) provided on end surfaces of the facing first movable body 201 and first fixed body 301 to perform positioning at the time of mounting.

Magnets 204 and 304 are embedded on the end surfaces of the second movable body 202 and the second fixed body 302. The magnets 204 and 304 attract magnets (not illustrated) embedded on the end surfaces of the facing first movable body 201 and first fixed body 301 for fixing at the time of mounting. In the embodiment, since the fixed body 300 is partitioned by dividing 360 degrees of the entire circumference into 180 degrees, the first fixed body 301 and the second fixed body 302 each have the same shape and can be used as one member.

Figure 3:
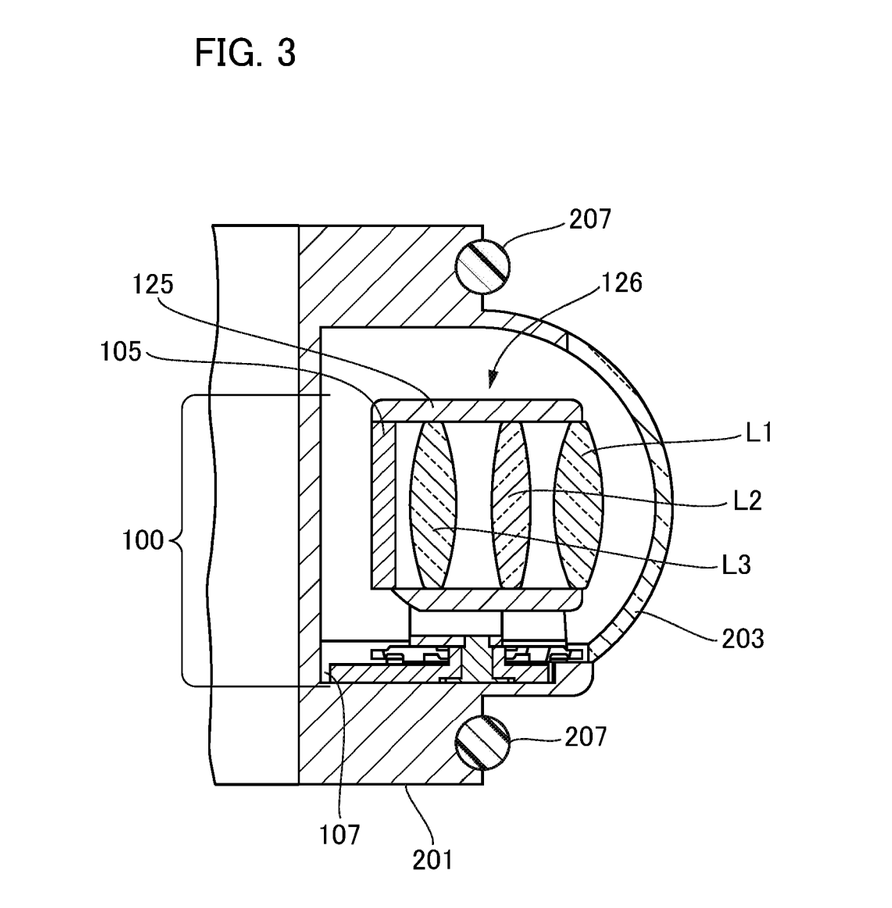
FIG. 3 is a sectional view illustrating an aspect in which an imaging device is disposed in a first movable body.
Figure 4A:
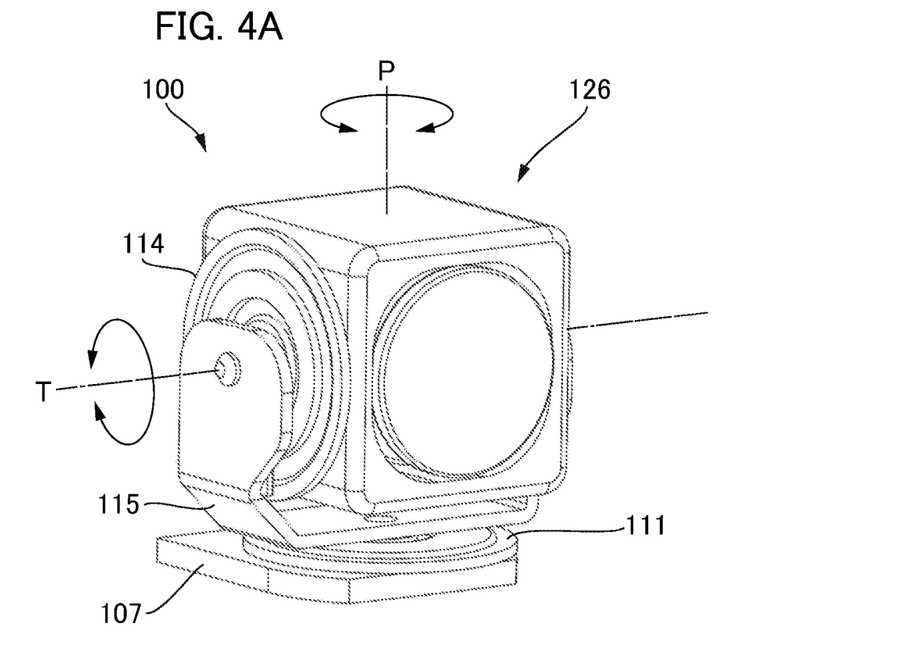
FIGS. 4A and 4B are diagrams illustrating a configuration of an imaging device.
Figure 4B:
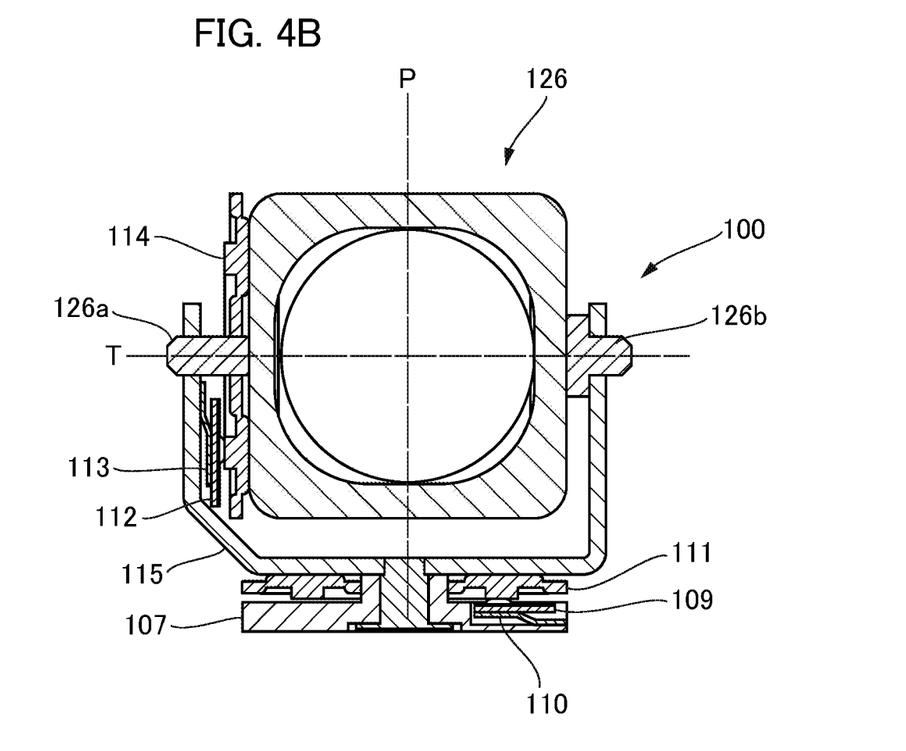

FIG. 3 is a sectional view illustrating an aspect in which an imaging device is disposed in a first movable body. FIGS. 4A and 4B are diagrams illustrating a configuration of an imaging device. FIG. 4A is a perspective view illustrating the imaging device 100 and FIG. 4B is a sectional view illustrating the imaging device 100 taken along a plane including rotational axes P and T.

As illustrated in FIG. 3, an imaging unit 126 included in the imaging device 100 includes lenses L1, L2, and L3 and an image sensor 105. A lens configuration in the imaging unit 126 is not limited to the configuration illustrated in FIG. 3. Light incident from the window unit 203 passes through the lens L1, the lens L2, and the lens L3 to be condensed on an imaging surface of the image sensor 105.

As illustrated in FIG. 4B, the imaging unit 126 is held to be rotatable in a tilting (tilt) direction about the axis T when shafts 126a and 126b are supported by a holding member 115. A rotational member 114 is fixed to the imaging unit 126. A plate spring 113 fixed to the holding member 115 urges a vibrator 112 so that the vibrator 112 is pressed to the rotational member 114. The vibrator 112 includes a piezoelectric element and a contact portion that has a protrusion shape. The contact portion and the piezoelectric element are bonded. The protrusion shape of the contact portion is pressed to the rotational member 114 and the piezoelectric element is connected to a transmission unit (not illustrated).

The vibrator 112 generates an elliptical motion at the front end of the protrusion shape of the contact portion by vibration of the piezoelectric element to which electricity is supplied from the transmission unit to rotationally drive the rotational member 114 due to a frictional force in a tilt direction about the axis T. Thus, the imaging unit 126 is rotated in the tilt direction, and thus an imaging direction of the imaging device 100 is changed.

The holding member 115 is held by a base member 107 to be rotatable in a panning (pan) direction about the axis P. A rotational member 111 is fixed to the holding member 115. The plate spring 110 fixed to the base member 107 urges a vibrator 109 so that the vibrator 109 is pressed against the rotational member 111.

The vibrator 109 has a similar configuration to the vibrator 112. In the vibrator 109, the protrusion shape of a contact portion is pressed to the rotational member 111 and a piezoelectric element is connected to a transmission unit (not illustrated). In accordance with an action of the vibrator 109 to which electricity is supplied from the transmission unit, the rotational member 111 is rotationally driven in a pan direction about the axis P. The imaging unit 126 held by the holding member 115 also rotates in the pan direction. Thus, the imaging direction of the imaging device 100 is changed.

As described above, in accordance with the actions of the vibrator 109 and the vibrator 112 (a second driving unit), the imaging unit 126 can be pan-driven in the rotational direction about the axis P and can be tilt-driven in the rotational direction about the axis T. For the pan-driving and the tilt-driving, a single type driving and both types of driving simultaneously are both possible.

As illustrated in FIG. 3, the base member 107 is fixed to the first movable unit 201 and the imaging device 100 has a rotational area in the pan and tilt directions greater than a range that covers an angle of field in which the imaging unit 126 can perform imaging through the window unit 203. Inside the first movable unit 201, a space in which the imaging unit 126 does not come into contact with the first movable unit 201 even when the imaging unit 126 is rotated in the rotational area is guaranteed. The imaging device 100 may include an image processing device that performs image processing on a signal obtained through imaging. The imaging device 100 may transmit a signal obtained through the imaging to an external image processing device via a network and the image processing device may perform image processing on the signal.

Figure 5:
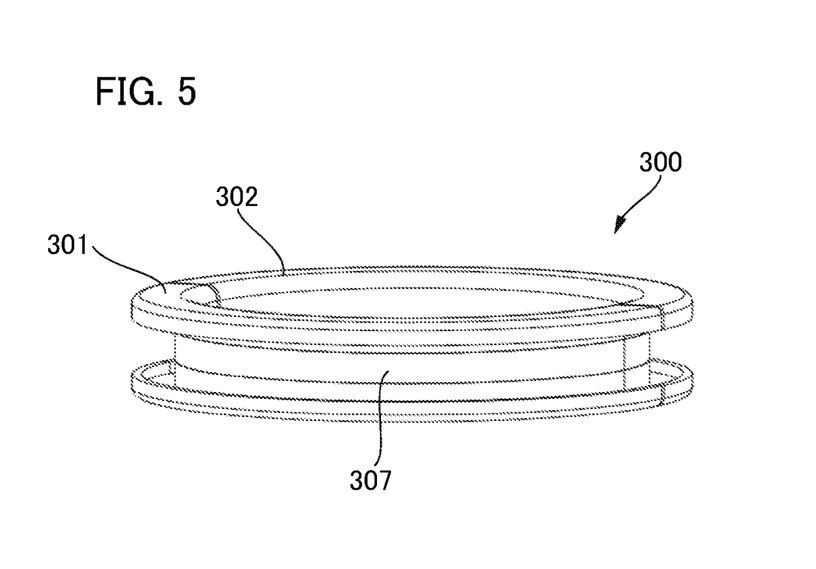
FIG. 5 is a diagram illustrating a configuration example of a fixed body.

FIG. 5 is a diagram illustrating a configuration example of a fixed body.

The fixed body 300 includes the rail member (rail unit) 307. The rail member 307 is formed of a metal in a cylindrical shape. A vibrator 208 (see FIG. 6) that rotationally drives the movable body 200 to be described below is pressed to the rail member 307. The rail member 307 is also partitioned into the same partition surfaces as a first fixed body 301 and a second fixed body 302. A vibrator may be provided in the fixed body 300 and a rail member 307 is provided in the movable body 200.

Figure 6:
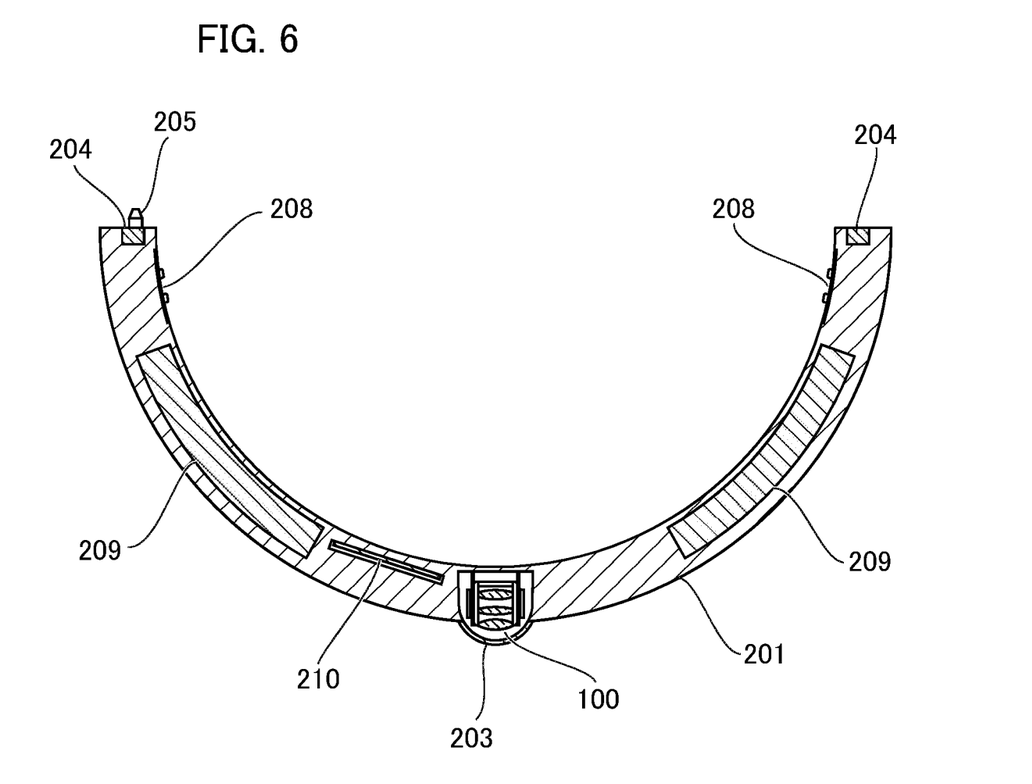
FIG. 6 is a sectional view illustrating a first movable body.

FIG. 6 is an exemplary sectional view illustrating a first movable body.

FIG. 6 illustrates a cross-section of the first movable body 201 when viewed from the side of the head of the user in FIGS. 1A to 1C. The plurality of vibrators 208 are provided to face the rail member 307 on the inner circumferential surface (the side facing the first fixed body 301) of the first movable body 201. The vibrators 208 function as a first driving unit that drives the movable body 200. The vibrators 208 are pressed to the rail member 307. In the example illustrated in FIG. 6, the first movable body 201 includes two vibrators 208, but at least two vibrators 208 may be provided in the first movable body 201. The number of vibrators 208 is not limited to 2.

The vibrator (actuator) 208 includes a contact portion and a piezoelectric element as in the vibrators 109 and 112. A protrusion shape of the contact portion is pressed to the rail member 307 and the piezoelectric element is connected to a transmission unit (not illustrated). The vibrator 208 generates an elliptical motion at the front end of the protrusion shape of the contact portion by vibration of the piezoelectric element to which electricity is supplied from the transmission unit to generate a frictional force with the rail member 307. Due to the generated frictional force, the movable body 200 obtains a driving force for the rail member 307, and thus can perform the above-described rotation. A battery 209 provided in the first movable body 201 is a power unit that supplies power to the vibrators 208, the vibrators 109 and 112 of the imaging device 100, and the like.

Figure 7:
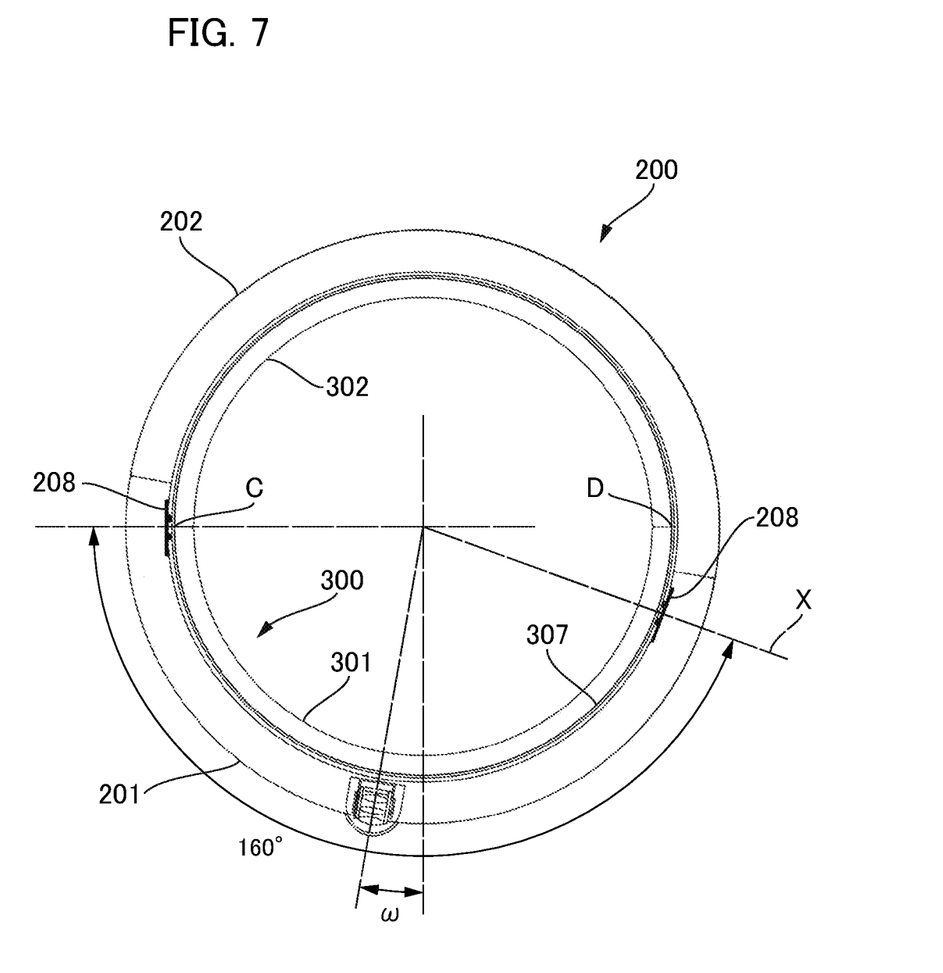
FIG. 7 is a diagram illustrating an example of a cross-section of the wearable terminal.

FIG. 7 is a sectional view illustrating the wearable terminal taken along substantially the middle of the rail member.

A relation between the vibrator 208 and the rail member 307 in a state in which the movable body 200 is rotated by a predetermined angle ω from the initial phase will be described with reference to FIG. 7.

Since the rail member 307 is partitioned into two pieces, joints C and D of two portions corresponding to the partition surfaces of the fixed body 300 appear on the rail member 307. When the movable body 200 is rotated and the vibrators 208 pass through the joints C and D of the rail member 307, a driving force obtained through a vibration action may decrease and stable power may not be obtained. In the embodiment, however, an interval of the two vibrators 208 is different from an interval of two partition surfaces of the fixed body 300. Specifically, the interval of the two vibrators 208 is set to an interval (160 degrees in FIG. 7) narrower than the interval (180 degrees in FIG. 7) between the two partition surfaces of the fixed body 300. As a result, since one of the two vibrators 208 provided on the inner circumferential surface of the first movable body normally deviates from the joints C and D, a rotational driving force can stably be generated.

Figure 8:
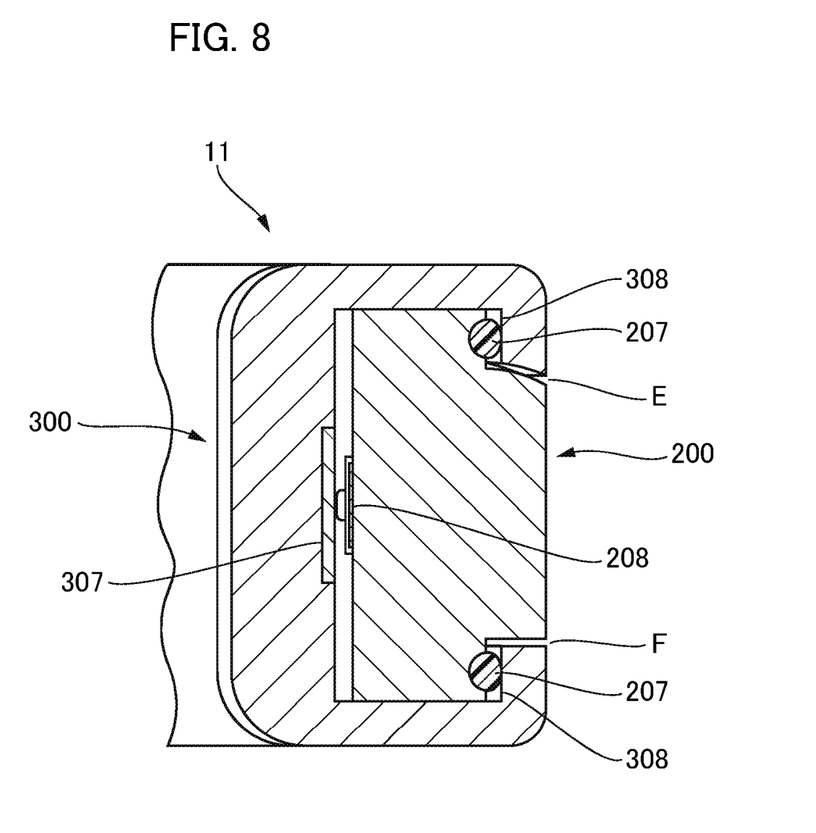
FIG. 8 is a diagram illustrating an example of a cross-section of the wearable terminal.

FIG. 8 is a diagram illustrating an example of a cross-section of the wearable terminal.

FIG. 8 illustrates a cross-sectional surface of the wearable terminal 11 along a plane X passing through the center of the vibrator 208 and the central axis of the rail member 307 illustrated in FIG. 7. The vibrators 208 provided in the movable body 200 are provided to face the rail member 307 of the fixed body 300.

In order for a stable rotational driving force to be generated, it is undesirable for waste or water droplets to be attached to the surface of the rail member 307 to which the vibrator 208 is pressed. Accordingly, it is necessary for the rail member 307 to be dust-proof and waterproof in the wearable terminal 11.

As illustrated in FIG. 8, two elastic bodies 207 concentric to the central axis of the circular rail member 307 are formed up and down to be integrated with the movable body 200. Pressing surfaces 308 are provided in the fixed body 300 to face the elastic bodies 207. Of course, elastic bodies to which the present invention can be applied are not limited to the elastic bodies formed to be integrated with the movable body 200 and the elastic bodies 207 may be formed to be separate from the movable body 200. When a configuration in which the elastic bodies 207 are formed to be separate from the movable body 200 is adopted, the elastic bodies 207 are pressed between the pressing surfaces 308 of the fixed body 300 and the curved surface of the movable body 200 concentric to the central axis of the rail member 307.

The pressing surfaces 308 are curved surfaces concentric to the central axis of the rail member 307 and are pressed around the entire circumferences of the circular elastic bodies 207. In FIG. 8, gaps occurring between the movable body 200 and the fixed body 300 are in communication with the outside at two portions E and F, but a foreign substance intruding into the gaps may not intrude any further inward because of the pressing of the elastic bodies 207 and the pressing surfaces 308. Since the elastic bodies 207 and the pressing surfaces 308 are pressed around the entire circumferences, countermeasures for making the rail member 307 dust-proof and waterproof throughout the circumferential gaps are effectively taken.

Next, a method of pressing the vibrators 208 will be described. To generate a rotational force through an action of the vibrators 208, it is necessary to press the vibrators 208 to the rail member 307, that is, urge the vibrators 208 toward the central axis of the rail member 307.

As illustrated in FIG. 8, the elastic bodies 207 pressed between the movable body 200 and the fixed body 300 urge the movable body 200 toward the central axis of the rail member 307 by their reaction. Accordingly, the vibrators 208 fixed to the movable body 200 are also urged toward the central axis of the rail member 307. In this way, in the embodiment, since the elastic bodies 207 provided for dust-proofing and waterproofing also serve to urge the vibrators 208, it is not necessary to newly provide urging members. The elastic bodies 207 are pressed around the circumference. Regardless of the portions of the inner circumference of the movable body 200 on which the vibrators 208 are disposed, the vibrators 208 can be stably urged toward the central axis of the rail member 307.

As described above, the wearable terminal 11 includes the circular fixed body 300 that includes the cylindrical rail member 307 and the circular movable body 200 that contains the imaging device 100 and can rotate about the central axis of the rail member 307. Thus, when the user mounts the wearable terminal 11 around his or her neck for imaging, the entire periphery of the user can be imaged. By partitioning the movable body 200 and the fixed body 300 into front and back portions, the movable body 200 and the fixed body 300 can be mounted on or demounted from the user.

By using the circular elastic members 207 concentric to the central axis of the rail member 307, it is possible to realize the dust-proof and waterproof rail member 307 and the pressing of the vibrators 208 to the rail member 307. A configuration of the present invention is not limited to the configuration exemplified in the foregoing embodiment. The materials, the shapes, the dimensions, the forms, the numbers, the disposition portions, and the like can be appropriately changed within the scope of the present invention without departing from the gist of the present invention. For example, only one imaging device 100 is provided in the first movable body 201 in the embodiment, but a plurality of imaging devices 100 may be provided in the first movable body or the imaging device 100 may also be provided in the second movable body.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-156083, filed Aug. 23, 2018, which is hereby incorporated by reference herein in its entirety.

What is claimed is:

1. An imaging system comprising:
   a movable unit in which an imaging device is provided;
   a fixed unit configured to support the movable unit to be movable; and
   a driving unit configured to move the movable unit with respect to the fixed unit,
   wherein the driving unit includes (1) a contact portion with a protrusion shape coming into contact with a rail unit guiding movement of the movable unit and (2) a piezoelectric element vibrating the contact portion,
   wherein the fixed unit is partitioned into a first fixed unit and a second fixed unit on a plurality of partition surfaces, and
   wherein the movable unit is partitioned into a first movable unit including the imaging device and a second movable unit on a plurality of partition surfaces.

2. The imaging system according to claim 1, wherein the rail unit has a cylindrical shape, and
   wherein the movable unit rotates about a central axis of the rail unit.

3. The imaging system according to claim 1, wherein the movable unit and the fixed unit are each able to be partitioned into at least two pieces.

4. The imaging system according to claim 1, wherein the partition is possible in only a phase in which the partition surfaces of the first fixed unit and the second fixed unit match the partition surfaces of the first movable unit and the second movable unit.

5. The imaging system according to claim 1, wherein a power unit is provided in the first movable unit.

6. The imaging system according to claim 1, wherein the driving unit is disposed on a side of the movable unit facing the fixed unit, and
   wherein the rail unit is disposed on a side of the fixed unit facing the movable unit.

7. The imaging system according to claim 6, wherein the imaging device is disposed on a side of the movable unit that does not face the fixed unit.

8. The imaging system according to claim 1, further comprising:
   a second driving unit configured to drive an imaging unit included in the imaging device and change an imaging direction.

9. The imaging system according to claim 6, wherein a plurality of the driving units are disposed on a side of the movable unit facing the fixed unit, and
   wherein an interval at which the plurality of driving units are disposed is different from an interval of a plurality of partition surfaces of the fixed unit.

10. The imaging system according to claim 9, wherein one of the plurality of driving units is disposed to deviate from the partition surfaces of the fixed unit.

11. The imaging system according to claim 1, wherein the fixed unit has a curved surface concentric with a central axis of the rail unit, and
    wherein the imaging system comprises a circular elastic member pressed between the movable unit and the curved surface which the fixed unit has.

12. The imaging system according to claim 1, wherein the imaging system is used in a wearable device.

13. An imaging system comprising:
    a mover in which an imaging device is provided;
    a base configured to support the mover to be movable; and
    an actuator configured to move the mover with respect to the base,
    wherein the actuator includes (1) a contact portion and (2) a piezoelectric element vibrating the contact portion,
    wherein the actuator moves with the mover,
    wherein the base is partitioned into a first base and a second base on a plurality of partition surfaces, and
    wherein the mover is partitioned into a first mover including the imaging device and a second mover on a plurality of partition surfaces.

* * * * *